(12) United States Patent
Yamagishi et al.

(10) Patent No.: US 10,637,948 B2
(45) Date of Patent: Apr. 28, 2020

(54) CONTENT SUPPLY APPARATUS, CONTENT SUPPLY METHOD, PROGRAM, TERMINAL APPARATUS, AND CONTENT SUPPLY SYSTEM

(71) Applicant: SATURN LICENSING LLC, New York, NY (US)

(72) Inventors: Yasuaki Yamagishi, Kanagawa (JP); Masahito Mori, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 85 days.

(21) Appl. No.: 15/029,949

(22) PCT Filed: Oct. 14, 2014

(86) PCT No.: PCT/JP2014/077287
§ 371 (c)(1),
(2) Date: Apr. 15, 2016

(87) PCT Pub. No.: WO2015/064350
PCT Pub. Date: May 7, 2015

(65) Prior Publication Data
US 2016/0234328 A1    Aug. 11, 2016

(30) Foreign Application Priority Data
Oct. 28, 2013   (JP) ................. 2013-222973

(51) Int. Cl.
*H04L 29/08*    (2006.01)
*H04L 29/06*    (2006.01)
(Continued)

(52) U.S. Cl.
CPC .......... *H04L 67/2804* (2013.01); *G06F 21/10* (2013.01); *H04L 12/6418* (2013.01);
(Continued)

(58) Field of Classification Search
CPC ............ H04L 67/2804; H04L 65/1069; H04L 65/4076; H04L 65/4084; H04L 65/602;
(Continued)

(56) References Cited

U.S. PATENT DOCUMENTS 6,208,661 B1 *   3/2001   Marshall ................. H04L 29/06
                                                                370/230
7,602,723 B2 *  10/2009   Mandato ................. H04L 29/06
                                                                370/236
(Continued)

FOREIGN PATENT DOCUMENTS

CN        1623308 A       6/2005
RU    2 337 505 C2       10/2008
(Continued)

OTHER PUBLICATIONS

Extended European Search Report dated Jun. 21, 2017 in Patent Application No. 14858468.3.
(Continued)

*Primary Examiner* — Kristie D Shingles
(74) *Attorney, Agent, or Firm* — Oblon, McClelland, Maier & Neustadt, L.L.P.

(57) ABSTRACT

The present disclosure relates to a content supply apparatus, a content supply method, a program, a terminal apparatus, and a content supply system that allow to provide a receiver with pieces of general required network quality information for respective delivery paths for a case of supplying pieces of content of the same content through a plurality of different delivery paths. A content supply apparatus of the present disclosure delivers streams of content through a plurality of different networks, respectively, according to an adaptive streaming technique, and includes: a generating unit that generates metadata describing QoS parameters for the respective plurality of different networks through which the streams are delivered, and condition values of the QoS
(Continued)

parameters; and a delivering unit that delivers the generated metadata to a receiver. The present disclosure can be applied to a system that streams content.

17 Claims, 20 Drawing Sheets

(51) Int. Cl.
    *H04N 21/6547* (2011.01)
    *H04N 21/238* (2011.01)
    *H04N 21/845* (2011.01)
    *H04L 12/64* (2006.01)
    *H04W 4/18* (2009.01)
    *G06F 21/10* (2013.01)
    *H04W 88/06* (2009.01)

(52) U.S. Cl.
    CPC ...... *H04L 65/1069* (2013.01); *H04L 65/4076* (2013.01); *H04L 65/4084* (2013.01); *H04L 65/602* (2013.01); *H04L 65/604* (2013.01); *H04L 65/608* (2013.01); *H04L 65/80* (2013.01); *H04N 21/238* (2013.01); *H04N 21/6547* (2013.01); *H04N 21/8456* (2013.01); *H04W 4/18* (2013.01); *G06F 2221/2115* (2013.01); *H04W 88/06* (2013.01)

(58) Field of Classification Search
    CPC ... H04L 65/604; H04L 65/80; H04L 12/6418; H04L 65/608; G06F 21/10; G06F 2221/2115; H04N 21/238; H04N 21/6547; H04N 21/8456; H04W 4/18; H04W 88/06
    USPC .......................................................... 709/231
    See application file for complete search history.

(56) References Cited

U.S. PATENT DOCUMENTS

| | | | | |
|---|---|---|---|---|
| 8,180,385 | B2* | 5/2012 | Aaron | H04L 1/0002 370/329 |
| 8,683,013 | B2* | 3/2014 | Major | H04N 21/2225 375/377 |
| 8,860,779 | B2* | 10/2014 | Chen | H04N 7/152 348/14.08 |
| 9,338,693 | B2* | 5/2016 | Mahindra | H04W 28/12 |
| 9,820,259 | B2* | 11/2017 | Wang | H04W 72/005 |
| 2003/0236745 | A1* | 12/2003 | Hartsell | G06Q 20/102 705/40 |
| 2012/0324490 | A1* | 12/2012 | Hwang | H04N 21/2393 725/9 |
| 2013/0111028 | A1 | 5/2013 | Kondrad et al. | |
| 2013/0182643 | A1* | 7/2013 | Pazos | H04L 65/4076 370/328 |
| 2013/0286868 | A1* | 10/2013 | Oyman | H04W 24/06 370/252 |
| 2013/0294321 | A1* | 11/2013 | Wang | H04W 4/06 370/312 |
| 2013/0298170 | A1* | 11/2013 | ElArabawy | H04W 28/0231 725/62 |
| 2014/0098745 | A1* | 4/2014 | Balasubramanian | H04W 4/06 370/328 |
| 2014/0134970 | A1* | 5/2014 | Pazos | H04L 65/4069 455/404.1 |
| 2014/0201323 | A1* | 7/2014 | Fall | H04L 67/10 709/217 |
| 2014/0219088 | A1* | 8/2014 | Oyman | H04N 21/23439 370/231 |
| 2016/0134680 | A1* | 5/2016 | Yamagishi | H04L 65/4076 709/219 |

FOREIGN PATENT DOCUMENTS

| | | |
|---|---|---|
| WO | 2005/002264 A1 | 1/2005 |
| WO | 2012/096372 A | 7/2012 |
| WO | WO 2013/009551 A2 | 1/2013 |
| WO | WO 2014/022470 A1 | 2/2013 |
| WO | 2013/057315 A | 4/2013 |
| WO | WO 2013/048484 A1 | 4/2013 |

OTHER PUBLICATIONS

Mitsuhiro Hirabayashi, "Realizing the Uninterrupted Video Distribution in the Existing Web Server", MPEG-Dash, Nikkei Electronics, Mar. 19, 2012, p. 87 (Including 12 Pages of English Translation).

Chinese Office Action for CN201480058022.1, dated Jun. 19, 2018. English translation provided. 27pg.

Russian Office Action issued in 1610239/40RU, dated Feb. 6, 2018, with English translation.

Office Action issued in Indian Patent Application No. 201627013230, 6 pages (with English translation).

* cited by examiner

FIG. 3

| Service Announcement & Metadata (USD, etc.) | Associated-Delivery Procedures | | MBMS Security | | | | | | |
|---|---|---|---|---|---|---|---|---|---|
| | ptp File Repair | Reception Reporting | Registration | Key Distribution (MSK) | | | | | |
| | | HTTP-digest | | MIKEY | | | | | |
| | HTTP | | | | | | | | |
| | TCP | | | | | | | | |
| | IP (unicast) | | | | | | | | |
| | ptp Bearer | | | | | | | | |

Application(s)

| MBMS Security | | Streaming Codecs (Audio, Video, Speech, etc.) | Download 3GPP file format, Binary data, Still images, Text, etc. | Associated-Delivery Procedures | Service Announcement & Metadata (USD, etc.) |
|---|---|---|---|---|---|
| Key Distribution (MTK) | | RTP PayloadFormats | | ptm File Repair | |
| MIKEY | | SRTP / RTP/RTCP | | FEC | |
| | | FEC | | FLUTE | |
| | | | UDP | | |
| | | IP(Multicast) or IP(Unicast) | | | |
| | | MBMS or ptp Bearer(s) | | | |

FIG. 10

| COMMON PARAMETERS FOR DVB SATELLITE BROADCASTING/CABLE TELEVISION |
|---|
| System availability<br>Link availability<br>BER before RS decoder<br>   Out of service<br>   In service<br>Error events logging<br>Transmitter symbol clock jitter and accuracy<br>RF/IF signal power<br>Noise power<br>Bit error count after RS<br>IQ signal analysis<br>   Introduction<br>   Modulation Error Ratio (MER)<br>   System Target Error (STE)<br>   Carrier suppression<br>   Amplitude Imbalance (AI)<br>   Quadrature Error (QE)<br>   Residual Target Error (RTE)<br>   Coherent interferer<br>   Phase Jitter (PJ)<br>   Signal-to-Noise Ratio (SNR)<br>Interference |

FIG. 11

| PARAMETERS FOR DVB CABLE TELEVISION |
|---|
| Cable specific measurements<br>  Noise margin<br>  Estimated noise margin<br>  Signal quality margin test<br>  Equivalent Noise Degradation (END)<br>  BER vs. $E_b/N_0$<br>  Phase noise of RF carrier<br>  Amplitude, phase and impulse response of the channel<br>  Out of band emissions |

FIG. 12

| PARAMETERS FOR DVB SATELLITE BROADCASTING |
|---|
| Satellite specific measurements<br>  BER before Viterbi decoding<br>  Receive BER vs. $E_b/N_o$<br>  IF spectrum |

FIG. 13

| PARAMETERS FOR TERRESTRIAL BROADCASTING (DVB-T) |
|---|
| RF frequency measurements |
|   RF frequency accuracy(Precision) |
|   RF channel width(Sampling Frequency Accuracy) |
|   Symbol Length measurement at RF(Guard Interval verification) |
| Selectivity |
| AFC capture range |
| Phase noise of local oscillators(LO) |
| RF/IF signal power |
| Noise power |
| RF and IF spectrum |
| Receiver sensitivity/dynamic range for a Gaussian channel |
| Equivalent Noise Degradation(END) |
|   Equivalent Noise Floor(ENF) |
| Linearity characterization(shoulder attenuation) |
| Power efficiency |
| Coherent interferer |
| BER vs. C/N ratio by variation of transmitter power |
| BER vs. C/N ratio by variation of Gaussian noise power |
| BER before Viterbi(inner)decoder |
| BER before RS(outer)decoder |
| BER after RS(outer)decoder |
| I/Q analysis |
|   N/A |
|   Modulation Error Ratio |
|   System Target Error |
|   Carrier Suppression |
|   Amplitude Imbalance |
|   Quadrature Error |
|   Phase Jitter |
| Overall signal delay |
| SFN synchronization |
|   MIP_timing_error |
|   MIP_structure_error |
|   MIP_presence_error |
|   MIP_pointer_error |
|   MIP_preriodicity_error |
|   MIP_ts_rate_error |
| System Error Performance |

FIG. 14

| PARAMETERS FOR TERRESTRIAL BROADCASTING (DVB-T2) |
|---|
| RF frequency accuracy |
| RF occupied bandwidth |
| Selectivity |
| AFC capture range |
| Phase noise of Local Oscillators(LO) |
| RF/IF signal power |
| MISO Group Power Ratio |
| Noise Power |
| RF and IF spectrum |
| Receiver sensitivity/dynamic range for a Gaussian channel |
| Linearity characterization(shoulder attenuation) |
| Power efficiency |
| PAPR effect |
| P1 Symbol Error Rate |
| BER before LDPC(inner)decoder |
| Number of LDPC iterations |
| BER before BCH(outer)decoder |
| Baseband Frame Error Rate BBFER |
| Errored Second Ratio ESR |
| IQ signal analysis |
|   Modulation Error Ratio(MER) |
|   Signal to interference Noise Ratio(SINR) |
|   Carrier Suppression(CS) |
|   Carrier Phase |
|   Amplitude Imbalance(AI) |
|   Quadrature Error(QE) |
| SFN synchronisation |
| L1 signalling error |
| RMS Delay-Spread(RMS-DS) |
| Maximum Excess Delay(MED) |
| Receiver Buffer Model(RBM)validation test |
| Ralative power Level during the non_P1 part of the FEF (RLF_non_P1) |

FIG. 15

| PARAMETERS FOR CABLE TELEVISION (DVB-C2) |
|---|
| RF frequency accuracy |
| RF Sampling frequency |
| AFC capture range |
| Phase noise of Local Oscillators(LO) |
| RF/IF signal power |
| Noise Power |
| RF and IF spectrum |
| Receiver sensitivity/dynamic range for a Gaussian channel |
| Linearity characterization(shoulder attenuation) |
| BER before LDPC(inner)decoder |
| Number of LDPC iterations |
| BER before BCH(outer)decoder |
| Baseband Frame Error Rate BBFER |
| IQ signal analysis |
| Modulation Error Ratio(MER) |
| Amplitude Imbalance(AI) |
| Quadrature Error(QE) |
| L1 signalling error |
| Receiver Buffer Model(RBM)validation test |

FIG. 16

| PARAMETERS FOR OTHER TERRESTRIAL BROADCASTING |
|---|
| channel id, according to Annex B.2 |
| centre frequency |
| signal strength (dBm or dBµV) |
| signal strength indicator, SSI (%), according to section 3.4.4.6 |
| signal quality indicator, SQI (%), according to section 3.4.4.7 |
| C/N (dB) |
| BER before Reed Solomon decoding (DVB-T) or BCH decoding (DVB-T2) |
| Uncorrected packets |

FIG. 17

| PARAMETERS FOR THIRD-GENERATION MOBILE PHONE (FREQUENCY-DIVISION MULTIPLEXING SCHEME) (UTRA FDD) TERMINALS |
|---|
| UE measurement abilities<br>  CPICH RSCP<br>  PCCPCH RSCP<br>  UTRA carrier RSSI<br>  GSM carrier RSSI<br>  CPICH Ec/No<br>  Transport channel BLER<br>  UE transmitted power<br>  SFN-CFN observed time difference<br>  SFN-SFN observed time difference<br>  UE Rx-Tx time difference<br>  Void<br>  UE GPS Timing of Cell Frames for UE positioning<br>  UE GPS code phase<br>  UE transmission power headroom<br>  UE GANSS Timing of Cell Frames for UE positioning<br>  UE GANSS code measurements<br>  E-UTRA RSRP<br>  Void<br>  E-UTRA RSRQ |

FIG. 18

| PARAMETERS FOR THIRD-GENERATION MOBILE PHONE (TIME-DIVISION MULTIPLEXING SCHEME) (UTRA TDD) TERMINALS |
|---|
| UE measurement abilities |
| P-CCPCH RSCP |
| CPICH RSCP |
| Timeslot ISCP |
| UTRA carrier RSSI |
| GSM carrier RSSI |
| SIR |
| CPICH Ec/No |
| Transport channel BLER |
| UE transmitted power |
| SFN-SFN observed time difference |
| SFN-CFN observed time difference |
| Observed time difference to GSM cell |
| UE GPS Timing of Cell Frames for UE positioning |
| Timing Advance($T_{ADV}$) for 1.28Mcps TDD |
| UE GPS code phase |
| UE transmission power headroom(1.28Mcps option only) |
| UE transmission power headroom(3.84Mcps and 7.68Mcps options) |
| E-UTRA RSRP |
| E-UTRA RSRQ |

FIG. 19

| PARAMETERS FOR LTE (E-UTRA) TERMINALS |
|---|
| UE measurement capabilities<br>  Reference Signal Received Power (RSRP)<br>  Void<br>  Reference Signal Received Quality (RSRQ)<br>  UTRA FDD CPICH RSCP<br>  UTRA FDD carrier RSSI<br>  UTRA FDD CPICH Ec/No<br>  GSM carrier RSSI<br>  Void<br>  UTRA TDD P-CCPCH RSCP<br>  CDMA2000 1x RTT Pilot Strength<br>  CDMA2000 HRPD Pilot Strength<br>  Reference signal time difference (RSTD)<br>  UE GNSS Timing of Cell Frames for UE positioning<br>  UE GNSS code measurements<br>  UE Rx - Tx time difference |

FIG. 20

| Qos PARAMETERS FOR ATSC PHYSICAL LAYER |
|---|
| signal-to-Additive-wtite-Gaussian-noise (S/N)<br>Segment-Error Rate (SER) |

CONTENT SUPPLY APPARATUS, CONTENT SUPPLY METHOD, PROGRAM, TERMINAL APPARATUS, AND CONTENT SUPPLY SYSTEM

TECHNICAL FIELD

The present disclosure relates to a content supply apparatus, a content supply method, a program, a terminal apparatus, and a content supply system, and more particularly to a content supply apparatus, a content supply method, a program, a terminal apparatus, and a content supply system that are suited to be used when pieces of content of the same content are supplied through a plurality of delivery paths.

BACKGROUND ART

In recent years, OTT-V (Over The Top Video) has become the mainstream of streaming service that uses the Internet. As an internationally standardized moving image delivery protocol that can be used for OTT-V, there is known MPEG-DASH (Moving Picture Experts Group-Dynamic Adaptive Streaming over HTTP; hereinafter, referred to as DASH) that uses the same HTTP as that for browsing Web sites (see, for example, Non-Patent Document 1).

In DASH, an adaptive streaming technique is implemented. Specifically, a content supplier prepares and delivers a plurality of streams of the same content with different bit rates for different image qualities, different angle-of-view sizes, etc. On the other hand, a content receiver selects an optimal stream from among the plurality of streams prepared by the supplier, according to a communication environment, decoding capability thereof, etc., and receives and plays back the selected stream, and further switches the stream being received to another according to a change in the communication environment, etc.

Note that the supplier supplies a metafile called an MPD (Media Presentation Description) to the receiver so that the receiver can adaptively select, receive, and play back a stream.

The MPD describes an address (url information) of a WEB server (supply source) that supplies files of segment streams where content streams (media data such as Audio/Video/Subtitle) are chunked, in response to a request from the receiver. Based on the url information, the receiver accesses the WEB server serving as the content supply source, to request a file of a segment stream (hereinafter, also referred to as segment file), and receives and plays back the segment file which is HTTP-unicast from the server in response to the request.

FIG. 1 shows an example of a configuration of a content supply system that streams content based on DASH.

This content supply system 10 is composed of a plurality of content supply apparatuses 20 that supply content; and multiple DASH clients 30 that receive and play back the content. The DASH clients 30 can be connected to the content supply apparatuses 20 through a CDN (Contents Delivery Network) 12 that uses Internet 11.

Each content supply apparatus 20 delivers a plurality of streams of content of the same content with different bit rates. The content supply apparatus 20 includes a content management server 21, a DASH segment streamer 22, and a DASH MPD server 23.

The content management server 21 manages source data of content to be delivered to the DASH clients 30, and generates a plurality of pieces of streaming data with different bit rates from the source data, and outputs the plurality of pieces of streaming data to the DASH segment streamer 22.

The DASH segment streamer 22 divides each piece of streaming data into segments in a temporal manner, and thereby generates a segment stream, e.g., fragmented MP4, and converts the generated segment stream into a file format and holds the file. Furthermore, in response to an HTTP request from a DASH client 30 to request a segment file, the DASH segment streamer 22 HTTP-unicasts, as a WEB server, the segment file held therein to the request source. Furthermore, the DASH segment streamer 22 notifies the DASH MPD server 23 of metadata including an address indicating a supply source of the segment files.

The DASH MPD server 23 generates an MPD that describes, for example, the address indicating the supply source (i.e., the DASH segment streamer 22) of the segment files. In addition, in response to an HTTP request from the DASH client 30 to request an MPD, the DASH MPD server 23 HTTP-unicasts, as a WEB server, the generated MPD to the request source.

On the other hand, a DASH client 30 requests the DASH MPD server 23 for an MPD, and obtains the MPD which is HTTP-unicast in response to the request. Furthermore, based on the obtained MPD, the DASH client 30 requests the DASH segment streamer 22 for a segment file, and receives and plays back the segment file which is HTTP-unicast in response to the request.

Note that the CDN 12 includes a proxy server (not shown), and the proxy server caches MPDs and segment files which are HTTP-unicast through the CDN 12. Then, in response to a request from a DASH client 30, the proxy server can HTTP-unicast a cached MPD or segment file to the request source, instead of the DASH MPD server 23 or the DASH segment streamer 22 which serves as a WEB server.

CITATION LIST

Non-Patent Document

Non-Patent Document 1: "Achieving Uninterrupted Video Streaming Using Existing Web Servers", Mitsuhiro Hirabayashi, NIKKEI ELECTRONICS 2012.3.19

SUMMARY OF THE INVENTION

Problems to be Solved by the Invention

As described above, in DASH, an adaptive streaming technique is implemented by HTTP-unicasting content.

Meanwhile, if a receiver can not only receive HTTP unicast through the Internet 11, but also receive multicast through various types of networks (terrestrial broadcasting, satellite broadcasting, a cellular communication network, a wireless LAN, etc.), then it is desirable to make those networks available as DASH delivery paths. Specifically, for example, it is assumed to perform FLUTE-multicast using a 3GPP communication network.

Meanwhile, when content streams are supplied through various delivery paths, it is desirable that instead of the receiver selecting an optimal stream simply by whether reception can be performed, the receiver be provided with pieces of general required network quality information for the case of supplying streams through the respective delivery paths, and be able to select a stream based on the pieces of information.

Specifically, it is considered to provide, for example, description of QoS parameters which are applied to streaming service in general, description of required reception quality for the case of receiving broadcasting, and description of required quality for the case of obtaining through a wireless LAN system.

The present disclosure is made in view of such circumstances and is to allow, when pieces of content of the same content are supplied through a plurality of different delivery paths, to provide a receiver with pieces of general required network quality information for the respective delivery paths.

Solutions to Problems

A content supply apparatus which is a first aspect of the present disclosure delivers streams of content through a plurality of different networks, respectively, according to an adaptive streaming technique, the content supply apparatus including: a generating unit that generates metadata describing QoS parameters for the respective plurality of different networks through which the streams are delivered, and condition values of the QoS parameters; and a delivering unit that delivers the generated metadata to a receiver.

The generating unit may generate an extended USD as the metadata, and the delivering unit may FLUTE-multicast the generated extended USD.

The plurality of different networks may include at least one of Internet, a terrestrial broadcast network, a satellite broadcast network, a cable television broadcast network, a mobile broadcast network, and a wireless LAN.

The generating unit may introduce an MPDBaseMapping element in the USD, introduces a RequierdQos element in the MPDBaseMapping element, and may describe, in the RequierdQos element, the QoS parameters for the respective plurality of different networks through which the streams are delivered, and the condition values of the QoS parameters.

The generating unit may introduce a RequierdQos element in DeliverMethod of the USD, and describe, in the RequierdQos element, the QoS parameters for the respective plurality of different networks through which the streams are delivered, and the condition values of the QoS parameters.

A content supply method, which is the first aspect of the present disclosure, for a content supply apparatus that delivers streams of content through a plurality of different networks, respectively, according to an adaptive streaming technique, wherein the content supply apparatus includes: a generating unit that generates metadata describing QoS parameters for the respective plurality of different networks through which the streams are delivered, and condition values of the QoS parameters; and a delivering unit that delivers the generated metadata to a receiver.

A program which is the first aspect of the present disclosure causes a computer that delivers streams of content through a plurality of different networks, respectively, according to an adaptive streaming technique to function as: a generating unit that generates metadata describing QoS parameters for the respective plurality of different networks through which the streams are delivered, and condition values of the QoS parameters; and a delivering unit that delivers the generated metadata to a receiver.

In the first aspect of the present disclosure, metadata that describes QoS parameters for a respective plurality of different networks through which streams are delivered, and condition values of the QoS parameters is generated, and the generated metadata is delivered to a receiver.

A terminal apparatus which is a second aspect of the present disclosure receives a stream delivered from a content supply apparatus that includes: a stream delivering unit that supplies streams of content through a plurality of different networks, respectively, according to an adaptive streaming technique; a generating unit that generates metadata describing QoS parameters for the respective plurality of different networks through which the streams are delivered, and condition values of the QoS parameters; and a metadata delivering unit that delivers the generated metadata to a receiver, the terminal apparatus being configured to: obtain the metadata and receive and play back the stream delivered through any one of the plurality of different networks, according to a determination made based on the obtained metadata as to whether reception can be performed.

In the second aspect of the present disclosure, metadata that describes QoS parameters for a respective plurality of different networks through which streams are delivered, and condition values of the QoS parameters is obtained, and a stream delivered through any one of the plurality of different networks is received and played back, according to a determination made based on the obtained metadata as to whether reception can be performed.

A content supply system which is a third aspect of the present disclosure includes a content supply apparatus and a terminal apparatus, wherein the content supply apparatus includes: a stream delivering unit that supplies streams of content through a plurality of different networks, respectively, according to an adaptive streaming technique; a generating unit that generates metadata describing QoS parameters for the respective plurality of different networks through which the streams are delivered, and condition values of the QoS parameters; and a metadata delivering unit that delivers the generated metadata to a receiver. On the other hand, the terminal apparatus is configured to: obtain the metadata and receive and playback the stream delivered through any one of the plurality of different networks, according to a determination made based on the obtained metadata as to whether reception can be performed.

In the third aspect of the present disclosure, the content supply apparatus supplies streams of content through a plurality of different networks, respectively, according to an adaptive streaming technique, generates metadata that describes QoS parameters for the respective plurality of different networks through which the streams are delivered, and condition values of the QoS parameters, and delivers the generated metadata to a receiver. On the other hand, the terminal apparatus obtains the metadata and receives and plays back a stream delivered through any one of the plurality of different networks, according to a determination made based on the obtained metadata as to whether reception can be performed.

Effects of the Invention

According to the first aspect of the present disclosure, metadata that describes QoS parameters for a respective plurality of different networks through which streams of content are delivered, and condition values of the QoS parameters can be delivered.

According to the second aspect of the present disclosure, a determination as to whether reception can be performed can be made based on metadata that describes QoS parameters for a respective plurality of different networks through which streams of content are delivered, and condition values of the QoS parameters.

According to the third aspect of the present disclosure, metadata that describes QoS parameters for a respective plurality of different networks through which streams of content are delivered, and condition values of the QoS parameters can be delivered to the terminal apparatus side, and the terminal apparatus side can make a determination as to whether reception can be performed, based on the metadata.

BRIEF DESCRIPTION OF DRAWINGS

FIG. 3 is a diagram showing a protocol stack of a USD.

FIG. 10 is a diagram showing an example of QoS parameters for DVB satellite broadcasting/cable television.

FIG. 11 is a diagram showing an example of QoS parameters for DVB cable television.

FIG. 12 is a diagram showing an example of QoS parameters for DVB satellite broadcasting.

FIG. 13 is a diagram showing an example of QoS parameters for terrestrial broadcasting (DVB-T).

FIG. 14 is a diagram showing an example of QoS parameters for terrestrial broadcasting (DVB-T2).

FIG. 15 is a diagram showing an example of QoS parameters for cable television (DVB-C2).

FIG. 16 is a diagram showing an example of QoS parameters for other terrestrial broadcasting.

FIG. 17 is a diagram showing an example of QoS parameters for 3G mobile phone (UTRA FDD) terminals.

FIG. 18 is a diagram showing an example of QoS parameters for 3G mobile phone (UTRA TDD) terminals.

FIG. 19 is a diagram showing an example of QoS parameters for LTE (E-UTRA) terminals.

FIG. 20 is a diagram showing an example of Qos parameters for ATSC physical layer.

MODE FOR CARRYING OUT THE INVENTION

<Exemplary Configuration of a Content Supply System>

Figure 1:
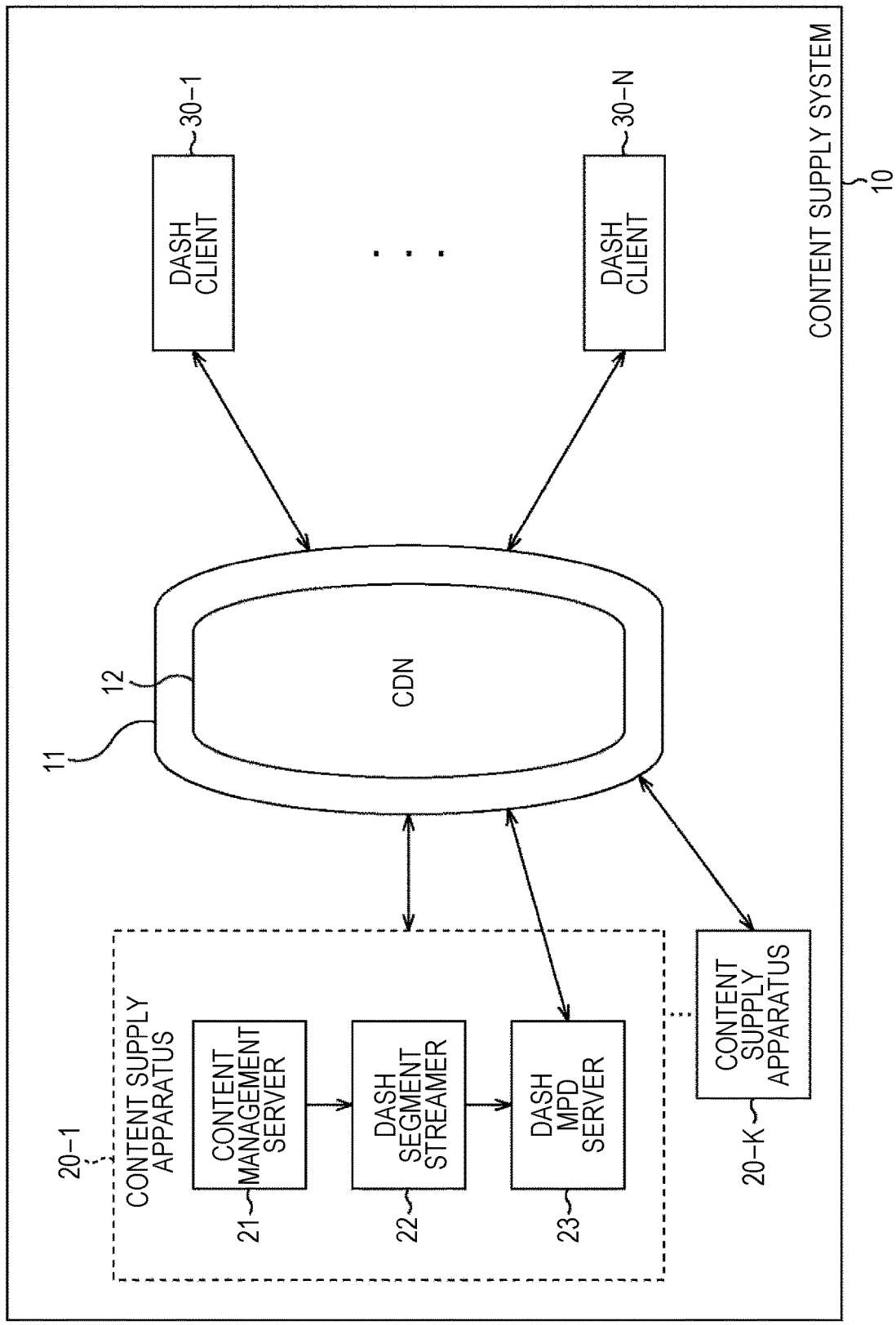
FIG. 1 is a block diagram showing an example of a configuration of a conventional content supply system.
Figure 2:
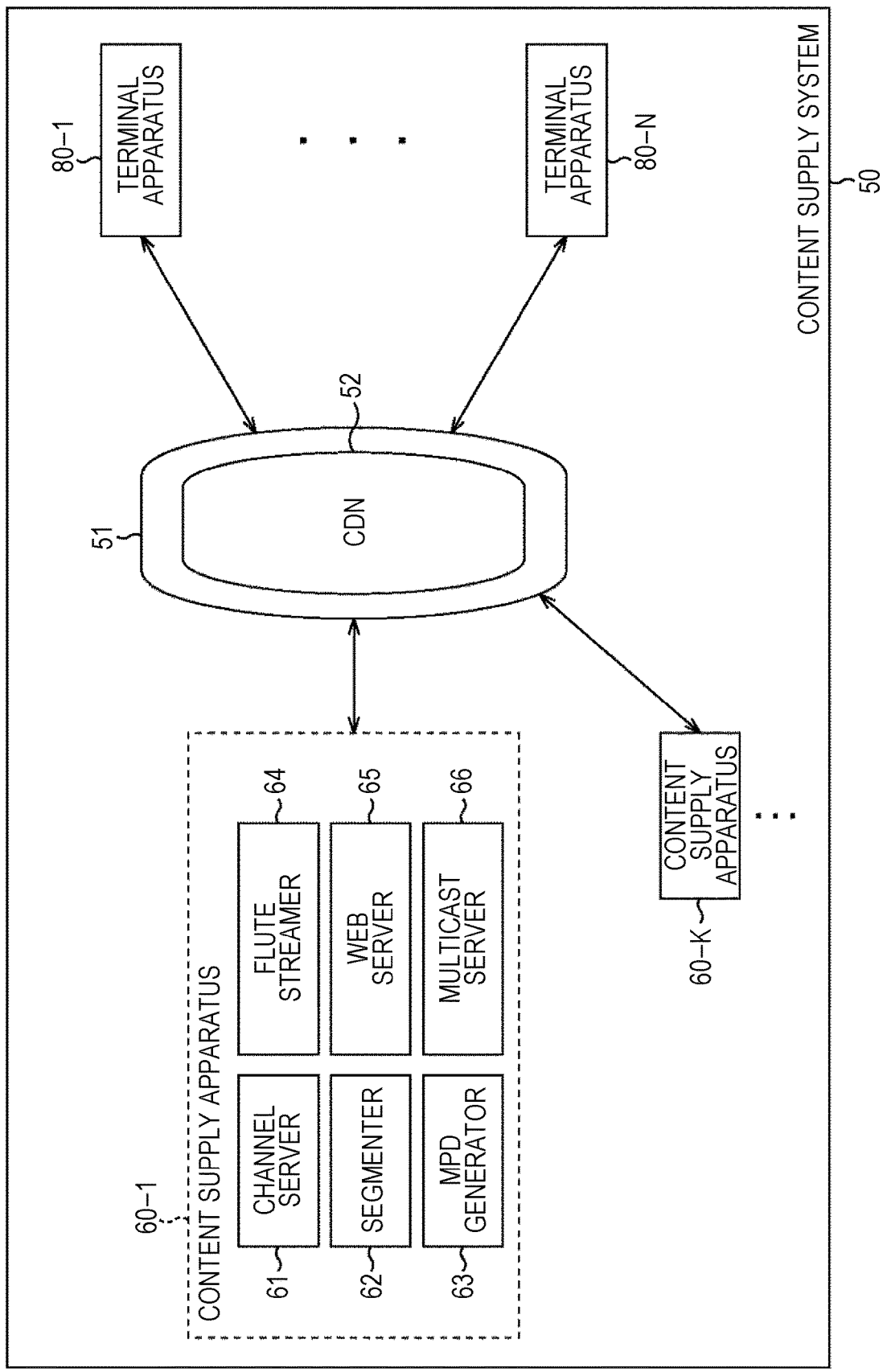
FIG. 2 is a block diagram showing an exemplary configuration of a content supply system to which the present disclosure is applied.

FIG. 2 shows an exemplary configuration of a content supply system which is an embodiment of the present disclosure.

A content supply system 50 is composed of a plurality of content supply apparatuses 60 and multiple terminal apparatuses 80. The content supply apparatuses 60 and the terminal apparatuses 80 can be connected to each other through a network 51.

The network 51 includes various types of broadcast networks using terrestrial broadcast waves, satellite broadcast waves, and (e) MBMS, and wireless LANs such as Wi-Fi, in addition to bidirectional communication networks represented by the Internet and a CDN 52 using the Internet.

The content supply apparatuses 60 not only HTTP-unicast content streams, but also multicast content streams. Here, the multicast includes broadcast/multicast on a point-to-point bearer, in addition to broadcast/multicast on a point-to-multipoint bearer through the network 51. Note, however, that the following description only refers to FLUTE-multicast as a representative of multicast.

Each content supply apparatus 60 includes a channel server 61, a segmenter 62, an MPD generator 63, a FLUTE streamer 64, a WEB server 65, and a multicast server 66.

Note that the channel server 61 to the multicast server 66 of the content supply apparatus 60 may be collectively disposed at one location, or may be disposed in a distributed manner through the Internet, etc.

The channel server 61 generates a plurality of pieces of streaming data with different bit rates from source data of content to be delivered to the terminal apparatuses 80, and outputs the plurality of pieces of streaming data to the segmenter 62.

The segmenter 62 divides each piece of streaming data into segments in a temporal manner, and thereby generates a segment stream, e.g., fragmentedMP4, and outputs the generated segment stream to the FLUTE streamer 64 and the WEB server 65. In addition, the segmenter 62 notifies the MPD generator 63 of metadata including an address indicating a supply source of the segment streams.

Based on the metadata notified by the segmenter 62, the MPD generator 63 generates an MPD that describes, for example, an address indicating a delivery source (WEB server 65) used when the segment files are HTTP-unicast, and outputs the MPD to the FLUTE streamer 64 and the WEB server 65. The MPD describes an obtaining destination of an SDP (Session Description) that describes the destination IP addresses of FLUTE sessions of FLUTE streams which are FLUTE-multicast and to which a segment stream to be HTTP-unicast can be switched.

The FLUTE streamer 64 divides the segment streams which are sequentially inputted from the segmenter 62, and stores the divided portions in ALC packets and thereby converts the segment streams into FLUTE streams, and outputs the FLUTE streams to the multicast server 66. In addition, the FLUTE streamer 64 stores the MPD generated by the MPD generator 63 in an ALC packet, and outputs the ALC packet to the multicast server 66.

Furthermore, the FLUTE streamer 64 describes a USD (User Service Bundle Description) that includes an SDP describing address information of FLUTE sessions and that is extended so as to be able to further describe pieces of general required network quality information for the respective streams which are delivered through the network 51, and outputs the USD to the multicast server 66. The USD will be described in detail with reference to FIG. 3 and subsequent drawings.

In response to an HTTP request requesting an MPD, which is sent from a terminal apparatus 80, the WEB server 65 HTTP-unicasts the MPD inputted from the MPD generator 63, to the request source. In addition, in response to an HTTP request requesting a segment file, which is sent from the terminal apparatus 80, the WEB server 65 HTTP-unicasts the segment file held therein to the request source.

The multicast server 66 FLUTE-multicasts the MPD and USD inputted from the FLUTE streamer 64. In addition, the multicast server 66 FLUTE-multicasts the FLUTE streams inputted from the FLUTE streamer 64.

A terminal apparatus 80 obtains an MPD from a content supply apparatus 60 through the network 51. Specifically, the terminal apparatus 80 sends an HTTP request requesting an MPD and receives an MPD which is HTTP-unicast in response to the HTTP request, or receives an MPD which is FLUTE-multicast. Note that when the terminal apparatus 80 receives an MPD which is FLUTE-multicast, announcement information that describes a portal channel of the multicast server 66 that performs FLUTE-multicast is referred to.

The announcement information is announced using, for example, an SDP (Session Description) element of a USD which is signaling metadata. The USD is transferred through FLUTE/UDP/IP (Multicast or Unicast).

Furthermore, the terminal apparatus 80 sends an HTTP request requesting a segment stream to the WEB server 65, based on the obtained MPD, and receives and plays back a segment stream file which is HTTP-multicast in response to the HTTP request.

Moreover, the terminal apparatus 80 obtains a USD including an SDP, based on the obtained MPD and receives and plays back a FLUTE stream which is FLUTE-multicast based on the SDP.

Note that there may be a case in which instead of the WEB server 65, a proxy server present on the CDN 52 responds to an HTTP request sent from the terminal apparatus 80, and the proxy server HTTP-unicasts an MPD or segment request cached therein.

[Extension of the USD]

As described above, the USD is used to announce a portal channel where FLUTE-multicast is performed. In addition to that, in the present embodiment, the USD is also used for an application of providing a receiver with general required network quality information for the respective paths through which pieces of content are delivered.

FIG. 3 shows a protocol stack for the case of delivering a USD using MBMS.

The USD is stored in Service Announcement&Metadata 91, and is FLUTE-multicast through a broadcast/multicast channel.

Figure 4:
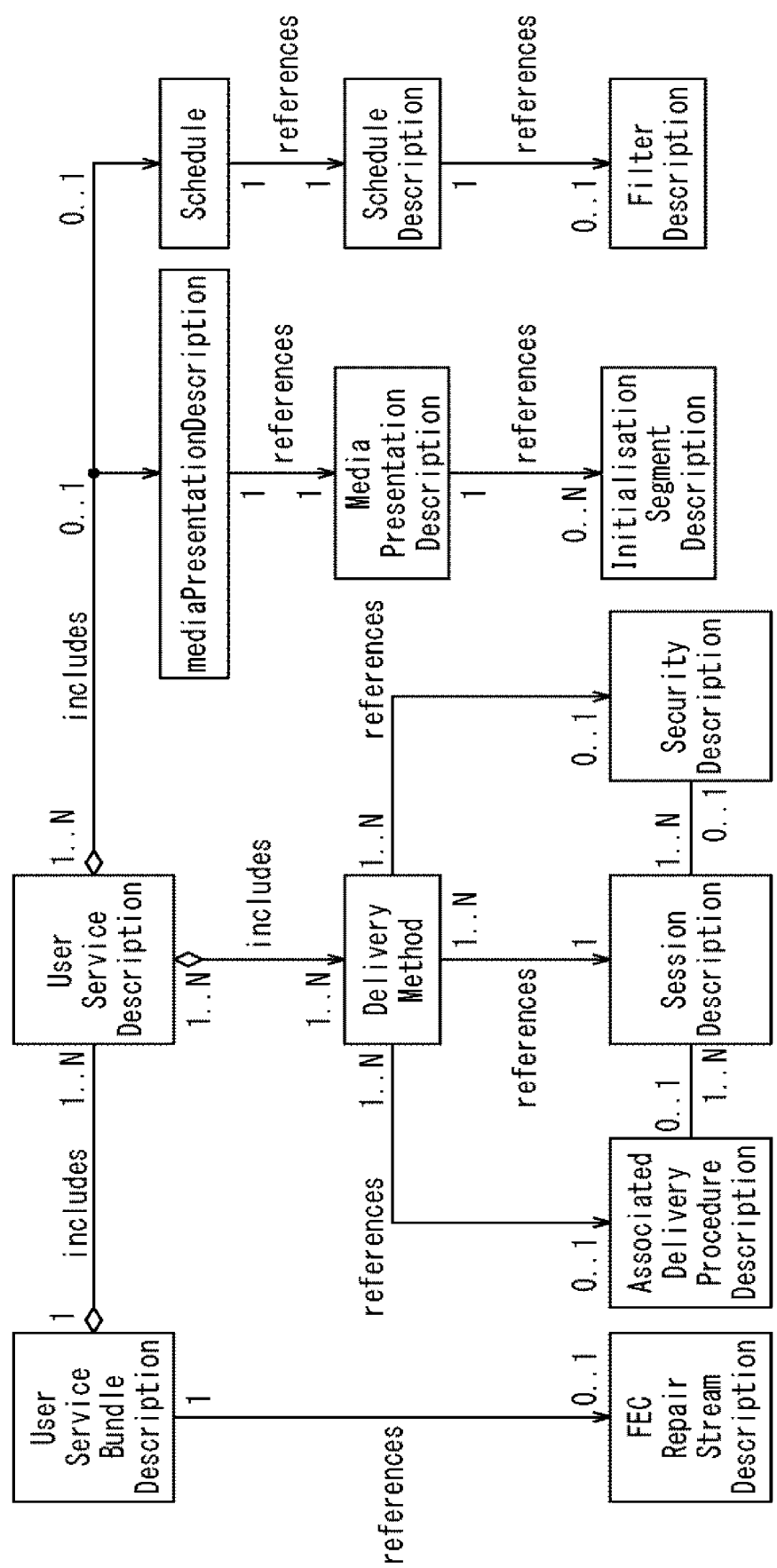
FIG. 4 is a diagram showing a structure of USD metadata before extension.
Figure 5:
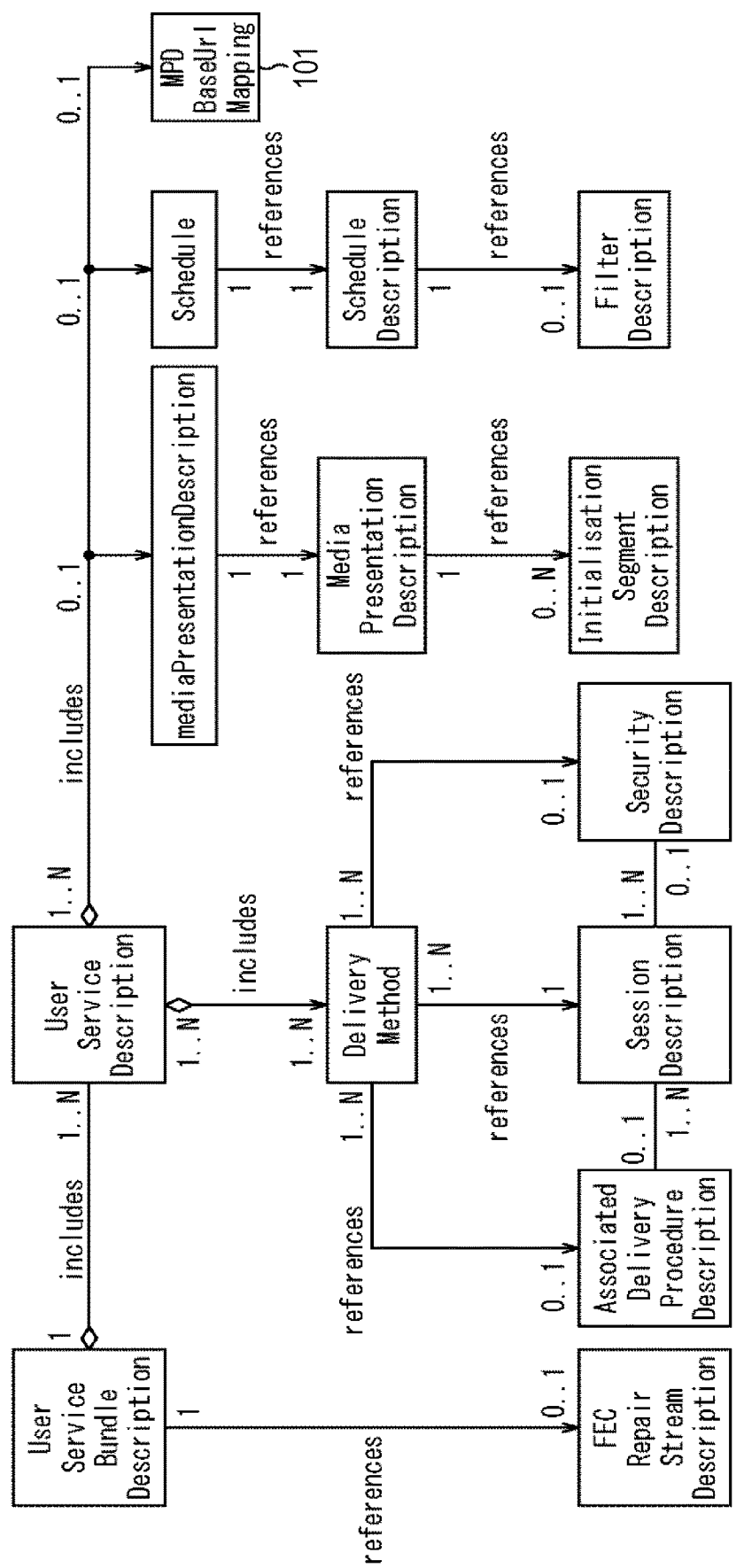
FIG. 5 is a diagram showing a structure of USD metadata after extension.
Figure 6:
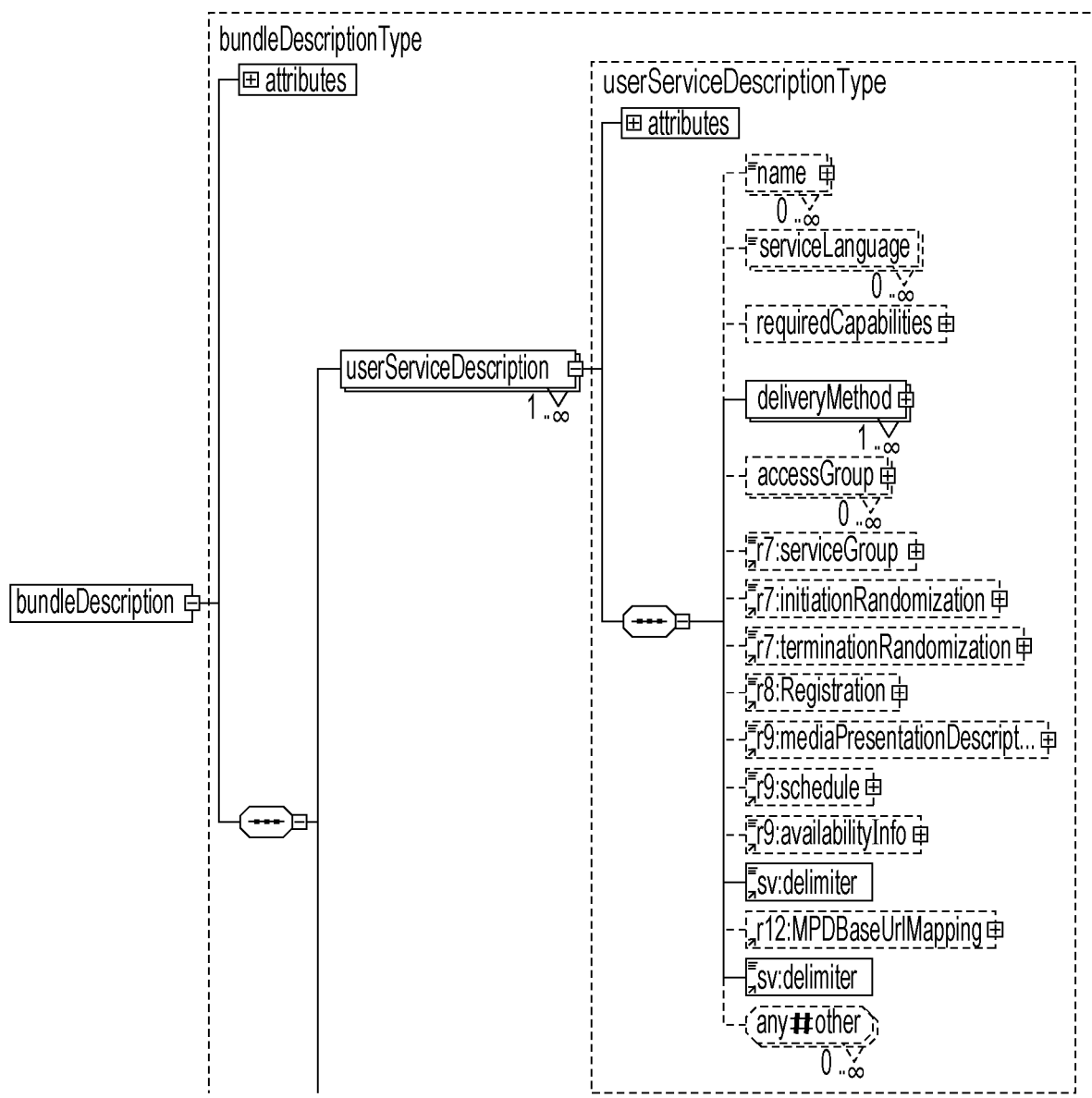
FIG. 6 is a diagram showing a structure of USD metadata after extension.

Next, FIG. 4 shows a structure of USD metadata before extension, and FIGS. 5 and 6 show a structure of extended USD metadata. In the present embodiment, as shown in FIG. 5, MPDBaseUrlMapping 101 ("r12:MPDBaseUrlMapping" in FIG. 6) is introduced as a new element under UserServiceDescription.

The MPDBaseUrlMapping element 101 is to indicate a distinction as to whether the baseUrl of each of AdaptationSet and Representation described in an MPD (an MPD that describes streams (segment streams, etc.) to be switched to FLUTE streams that are announced by this USD) which is referred to by MediaPresentationDescription, is multicast or unicast.

Figure 7:
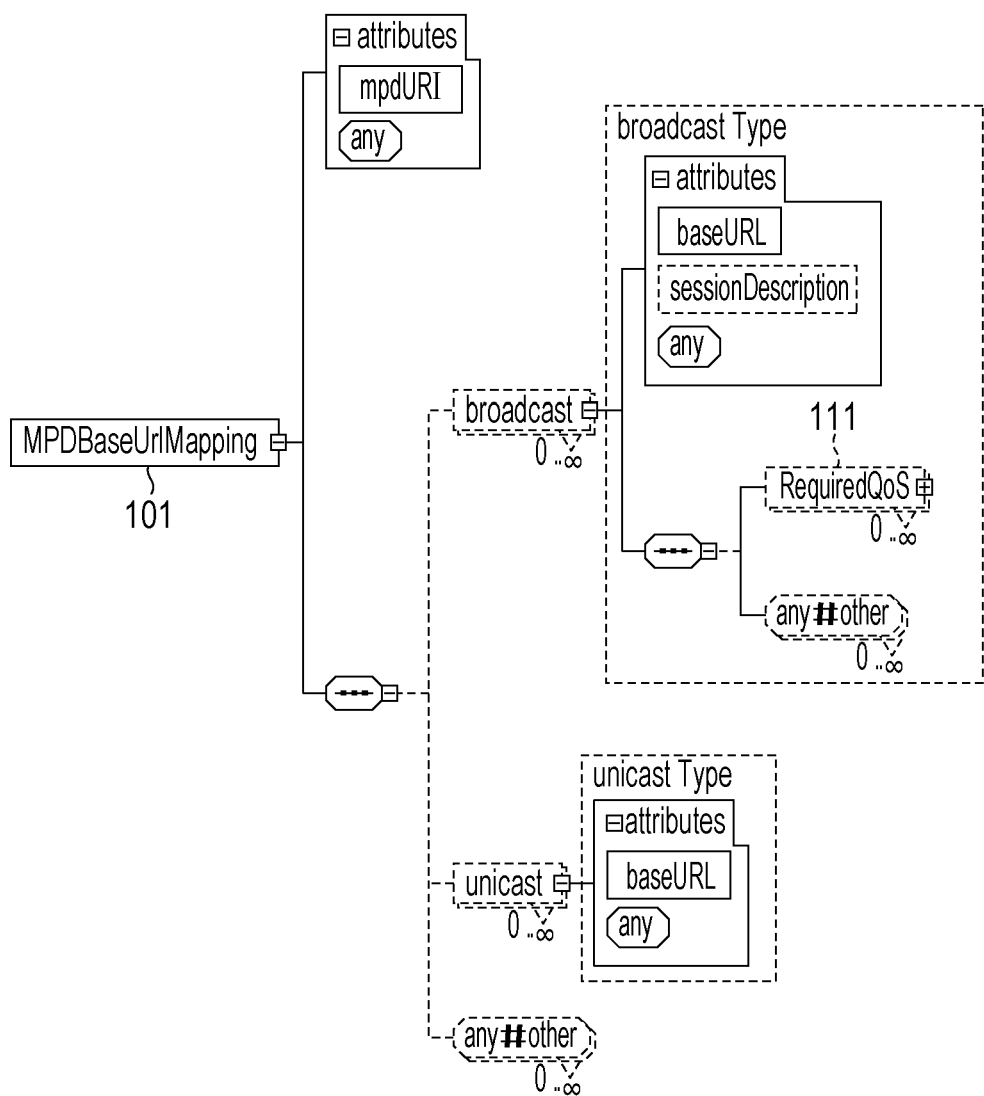
FIG. 7 is a diagram showing a structure of an MPDBaseUrlMapping element.

Next, FIG. 7 shows a structure of the MPDBaseUrlMapping element 101.

The MPDBaseUrlMapping element 101 stores a broadcast element (list) and a unicast element (list). The broadcast element stores a baseURL attribute indicating one that is multicast (including broadcast) between the baseUrls of AdaptationSet and Representation described in a corresponding MPD. Furthermore, the broadcast element stores a sessionDescription attribute that stores a reference to sessionDescription associated with the stored baseUrl attribute; and a requiredQoS element 111 that stores QoS parameters (required network quality information) for delivery paths.

The unicast element stores a baseURL attribute indicating one that is unicast between the baseUrls of AdaptationSet and Representation described in the corresponding MPD.

An MPDBaseUrlMapping/@mpdURI attribute stores a URL of an MPD file to be referred to.

Note that the disposition of the requiredQoS element 111 that stores QoS parameters (required network quality information) for delivery paths is not limited to the example shown in FIG. 7. For example, the requiredQoS element 111 may be disposed as shown in FIG. 8.

Figure 8:
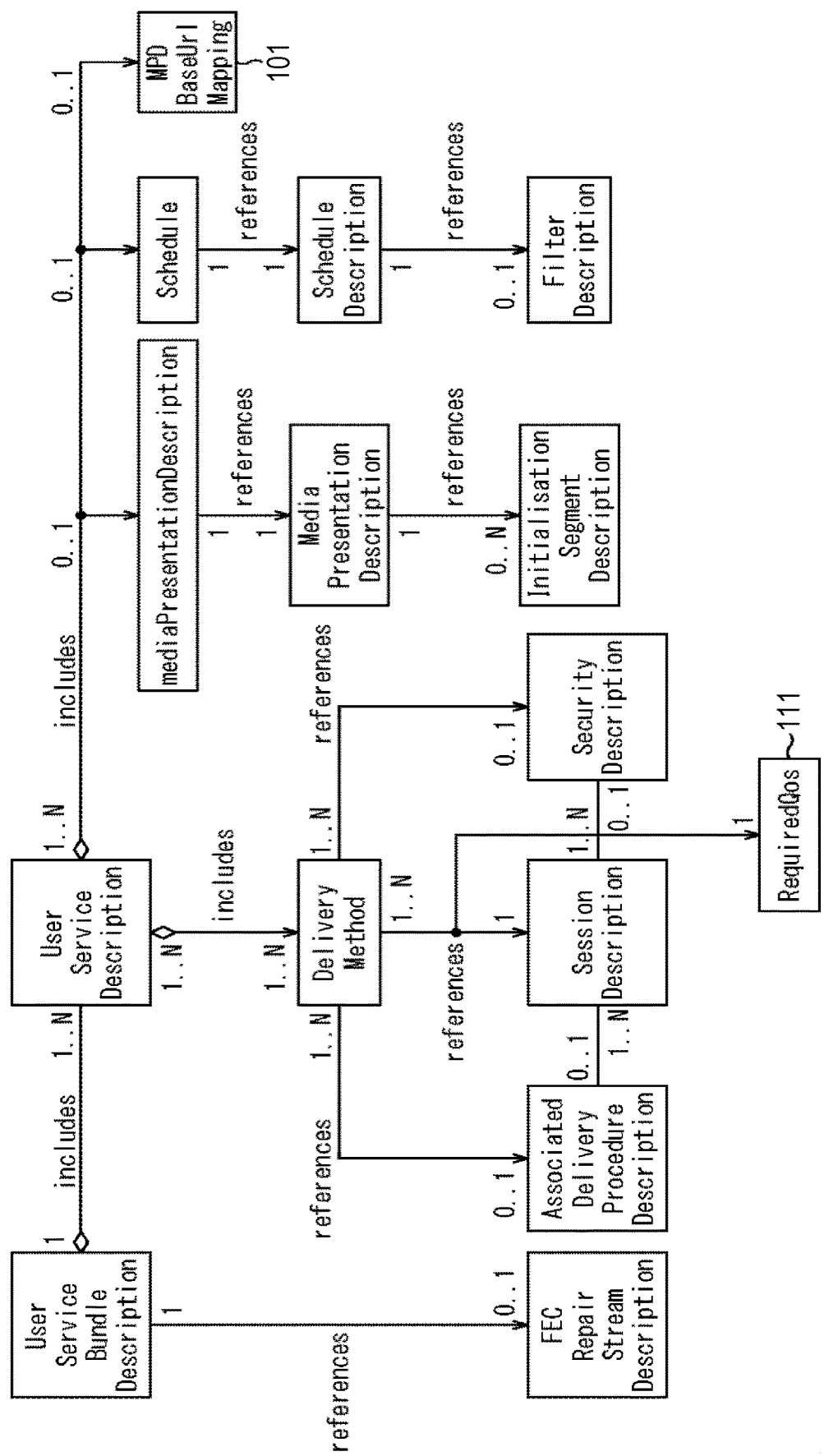
FIG. 8 is a diagram showing another example of disposition of a requiredQoS element.
Figure 9:
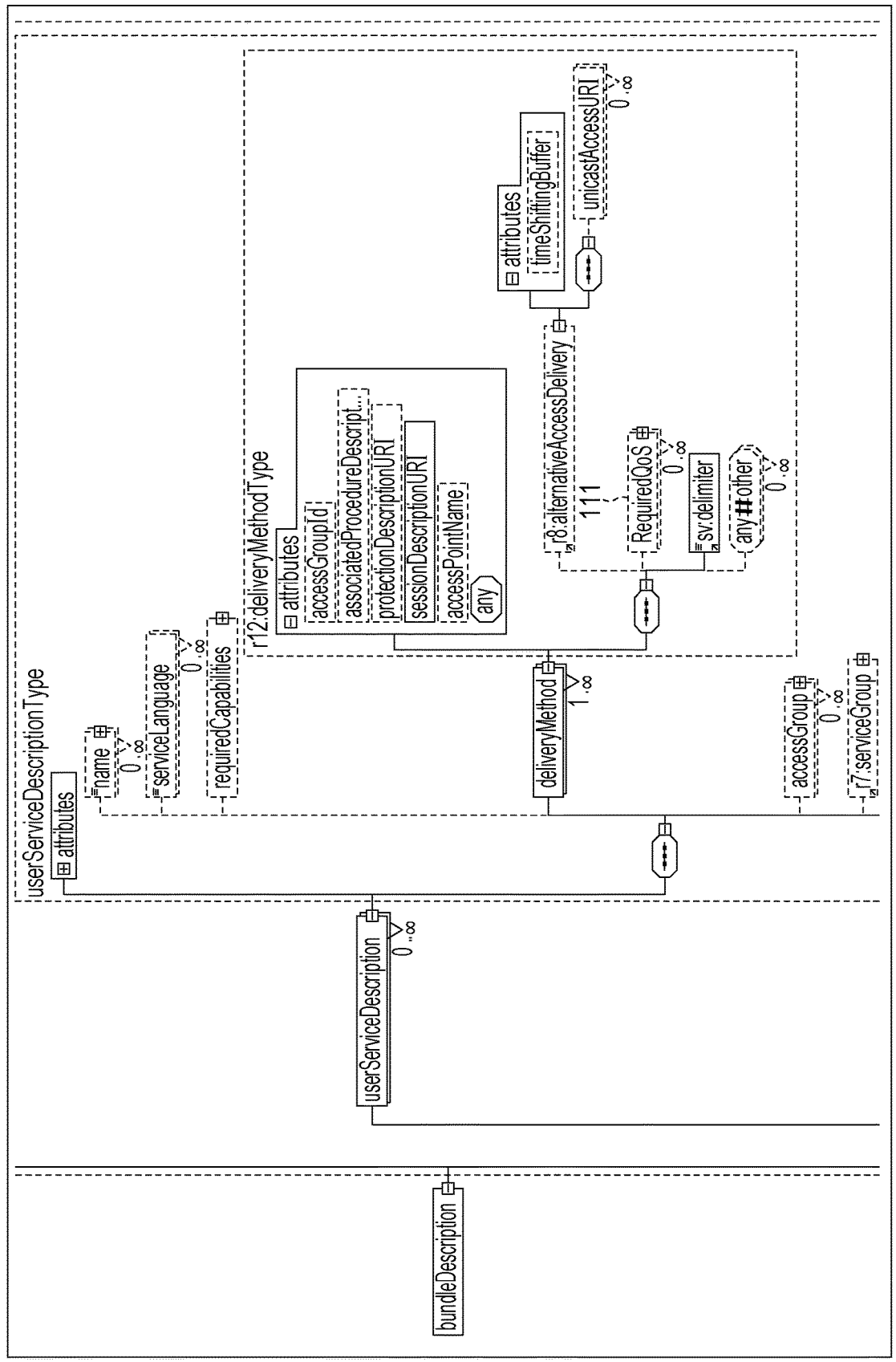
FIG. 9 is a diagram showing still another example of disposition of the requiredQoS element.

FIGS. 8 and 9 show an example in which the requiredQoS element 111 is disposed under a DeliveryMethod element of USD metadata.

<Specific Example of a Qos Parameter Stored in the RequiredQoS Element>

The requiredQoS element stores a parameterURI attribute that specifies a QoS parameter required to tune a content deliverypath; and a requiredValue element ("upperLimit (upper limit)", "lowerLimit (lower limit)", or "just (specified value)") as a condition value of the parameterURI attribute.

<Exemplary Description of QoS Parameters>

Exemplary description of QoS parameters will be specifically described. For example, QoS parameters applied to streaming service in general include delay, delay jitter, loss (error), throughput, etc. Of them, the throughput is described as:

RequiredQoS/@parameterURI=urn:DownLinkThroughput (a unique identifier indicating downlink throughput), and when a lower limit thereof is specified as a condition value, the condition value is specified as:

RequiredQoS/requiredValue/@lowerLimit="3 Mbps" (which means that the lower limit of the downlink throughput is 3 Mbps).

In addition, for example, representative parameters indicating the physical layer signal quality of a broadcast or a mobile phone terminal for the case of receiving a broadcast or the case of receiving a stream through a wireless LAN such as Wi-Fi, include a parameter related to radio field intensity and a parameter related to bit error rate (BER). More specifically, examples of the former include carrier-to-noise ratio (CN ratio) and received signal strength indicator (RSSI). Examples of the latter include bit error rates before/after an error correction process such as Reed Solomon (RS) (which varies depending on the broadcast/communication scheme) (BER before/after RS), and transport block error rate (BLER).

Of them, the CN ratio is described as:

RequiredQoS/@parameterURI=urn:CarrierToNoiseRatio (a unique identifier indicating CN ratio), and when a lower limit thereof is specified as a condition value, the condition value is described as:

RequiredQoSParameter/requiredValue/@lowerLimit="10 dB" (which means that the lower limit of the CN ratio is 10 dB).

In addition, when the CN ratio is classified into some classes (e.g., three classes) as condition values and evaluated, the condition values are defined as:

level 1 (specified as "urn:CNclass1"): $10^{-3}$ or more (bad), level 2 (specified as "urn:CNclass2"): $10^{-5}$ or more and less than $10^{-3}$ (fair), and level 3 (specified as "urn:CNclass3"): less than $10^{-5}$ (good), and then the CN ratio is described as:

RequiredQoS@parameterURI=urn:CarrierToNoiseRatio (a unique identifier indicating C/N), and the condition values are specified as:

RequiredQoS/requiredClass/@class="urn:CNclass2"
RequiredQoS/requiredClass/@class="urn:CNclass3"
(which means that the CN ratio of class 2 or 3 is required).

Note that, for the QoS parameters stored in the requiredQoS element, in addition to the above-described examples, parameters shown below can be described.

FIG. 10 shows an example of QoS parameters for DVB satellite broadcasting/cable television. FIG. 11 shows an example of QoS parameters for DVB cable television. FIG. 12 shows an example of QoS parameters for DVB satellite broadcasting. FIG. 13 shows an example of QoS parameters for terrestrial broadcasting (DVB-T). The examples of QoS parameters shown in FIGS. 10 to 13 are all defined in ETSI TR101290V1.2.1 (2001-05), "Digital Video Broadcasting (DVB); Measurement guidelines for DVB systems".

FIG. 14 shows an example of QoS parameters for terrestrial broadcasting (DVB-T2). These are defined in DVB BlueBook A14-2 (07/12), "Digital Video Broadcasting (DVB); Measurement guidelines for DVB systems; Amendment for DVB-T2 System".

FIG. 15 shows an example of QoS parameters for cable television (DVB-C2). These are defined in DVB BlueBook A14-3 (03/13), "Digital Video Broadcasting (DVB); Measurement guidelines for DVB systems; Amendment for DVB-C2 System".

FIG. 16 shows an example of QoS parameters for other terrestrial broadcasting. These are defined in NorDig Unified ver2.4.

FIG. 17 shows an example of QoS parameters for 3G mobile phone (UTRA FDD) terminals. These are defined in ETSI TS 125 215 V11.0.0 (2012-11); "Universal Mobile Telecommunications System (UMTS); Physical layer; Measurements (FDD) (3GPP TS 25.215 version 11.0.0 Release 11)".

FIG. 18 shows an example of QoS parameters for 3G mobile phone (UTRA TDD) terminals. These are defined in ETSI TS 125 225 V11.0.0 (2012-09); "Universal Mobile Telecommunications System (UMTS); Physical layer; Measurements (TDD) (3GPP TS 25.225 version 11.0.0 Release 11)".

FIG. 19 is a diagram showing an example of QoS parameters for LTE (E-UTRA) terminals. These are defined in ETSI TS 136 214 V11.1.0 (2013-02); "LTE; Evolved Universal Terrestrial Radio Access (E-UTRA); Physical layer; Measurements (3GPP TS 36.214 version 11.1.0 Release 11)".

FIG. 20 is a diagram showing an example of QoS parameters for ATSC physical layer. These are described in "Guide to the Use of the ATSC Digital Television Standard", Dec. 4, 2003.

[Operation of the Content Supply System 50]

Next, the operation of the content supply system 50 will be described.

Figure 21:
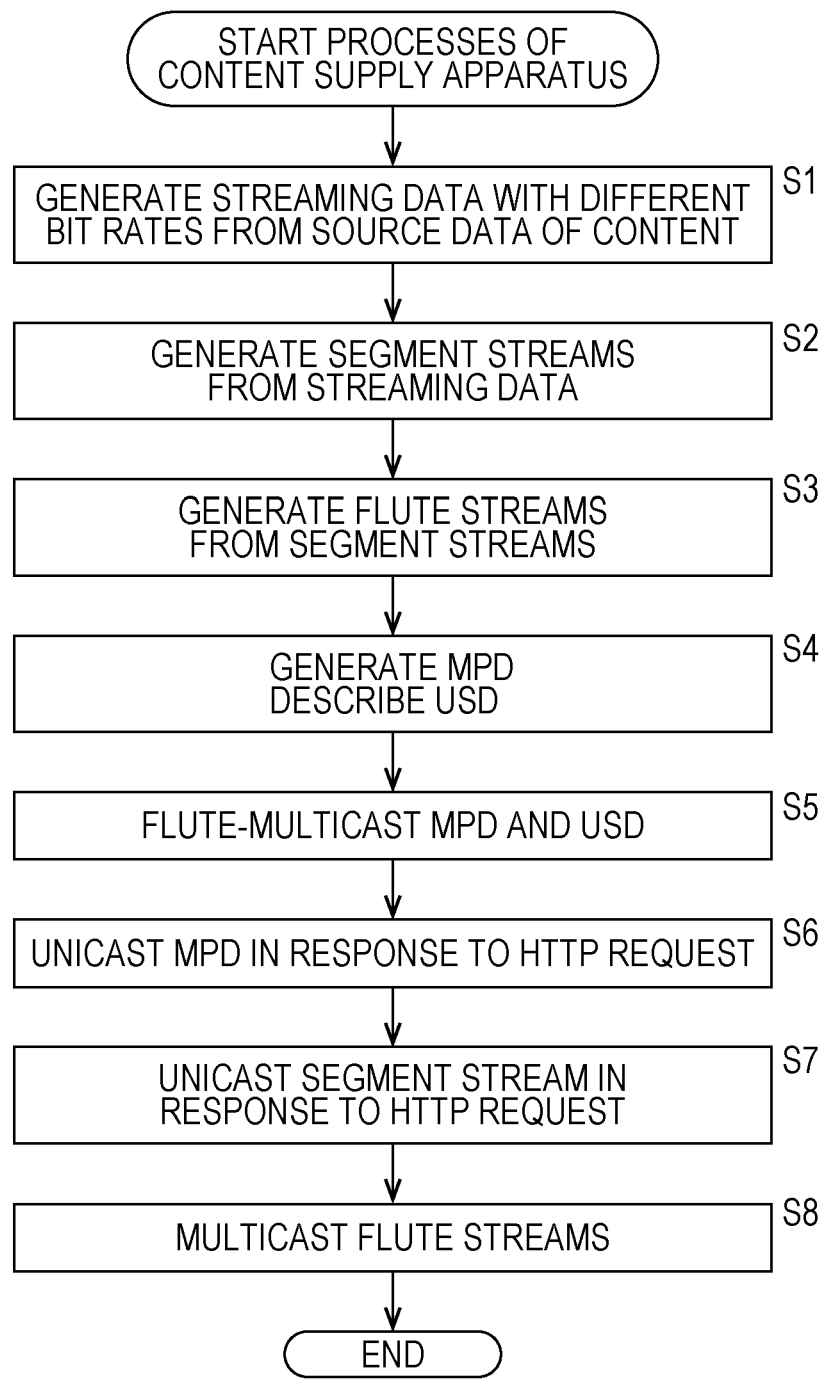
FIG. 21 is a flowchart describing the operation of a content supply apparatus.

FIG. 21 is a flowchart describing processes performed by a content supply apparatus 60 that HTTP-unicasts content streams and FLUTE-multicasts content streams.

At step S1, the channel server 61 of the content supply apparatus 60 generates a plurality of pieces of streaming data with different bit rates from source data of content to be delivered to the terminal apparatuses 80, and outputs the plurality of pieces of streaming data to the segmenter 62.

At step S2, the segmenter 62 generates a segment stream such as fragmented MP4, based on each piece of streaming data, and outputs the generated segment stream to the FLUTE streamer 64 and the WEB server 65. In addition, the segmenter 62 notifies the MPD generator 63 of metadata including an address indicating a supply source of the segment streams.

At step S3, the FLUTE streamer 64 divides the segment streams which are sequentially inputted from the segmenter 62, and stores the divided portions in ALC packets and thereby converts the segment streams into FLUTE streams, and outputs the FLUTE streams to the multicast server 66.

At step S4, the MPD generator 63 generates an MPD based on the metadata notified by the segmenter 62, and outputs the MPD to the FLUTE streamer 64 and the WEB server 65. The FLUTE streamer 64 stores the MPD generated by the MPD generator 63 in an ALC packet and outputs the ALC packet to the multicast server 66. In addition, the FLUTE streamer 64 describes a USD that includes an SDP about FLUTE sessions and that is extended so as to be able to further describe Qos parameters for the respective streams which are delivered through the network 51, and outputs the USD to the multicast server 66.

At step S5, the multicast server 66 FLUTE-multicasts the MPD and USD inputted from the FLUTE streamer 64.

At step S6, in response to an HTTP request requesting an MPD, which is sent from a terminal apparatus 80, the WEB server 65 HTTP-unicasts the MPD inputted from the MPD generator 63, to the request source. At step S7, in response to an HTTP request requesting a segment file based on the MPD, which is sent from the terminal apparatus 80, the WEB server 65 HTTP-unicasts the segment file held therein to the request source.

At step S8, the multicast server 66 FLUTE-multicasts the FLUTE streams inputted from the FLUTE streamer 64. Note that FLUTE-multicasting of the FLUTE streams can also be performed in real time simultaneously with the generation of segment streams based on which the FLUTE streams are generated. Description of the processes of the content supply apparatus 60 ends here.

On the other hand, a terminal apparatus 80 sends an HTTP request requesting an MPD and receives an MPD which is HTTP-unicast in response to the HTTP request, or receives an MPD which is FLUTE-multicast, and requests a segment stream file based on the MPD, and can receive and play back the segment stream file which is HTTP-unicast in response to the request. In addition, a FLUTE session can be received based on an SDP of a USD which is FLUTE-multicast. Furthermore, after determining, based on Qos parameters described in a requiredQoS element of the USD, whether each stream can be appropriately received, reception and playback can be performed.

Meanwhile, the content supply apparatuses 60 that perform the above-described series of processes and the terminal apparatuses 80 each can not only be configured by hardware, but also implemented by a computer executing software. The computer includes, for example, a computer that is incorporated in dedicated hardware and a general-purpose personal computer, for example, that can perform various types of functions by installing various types of programs.

Figure 22:
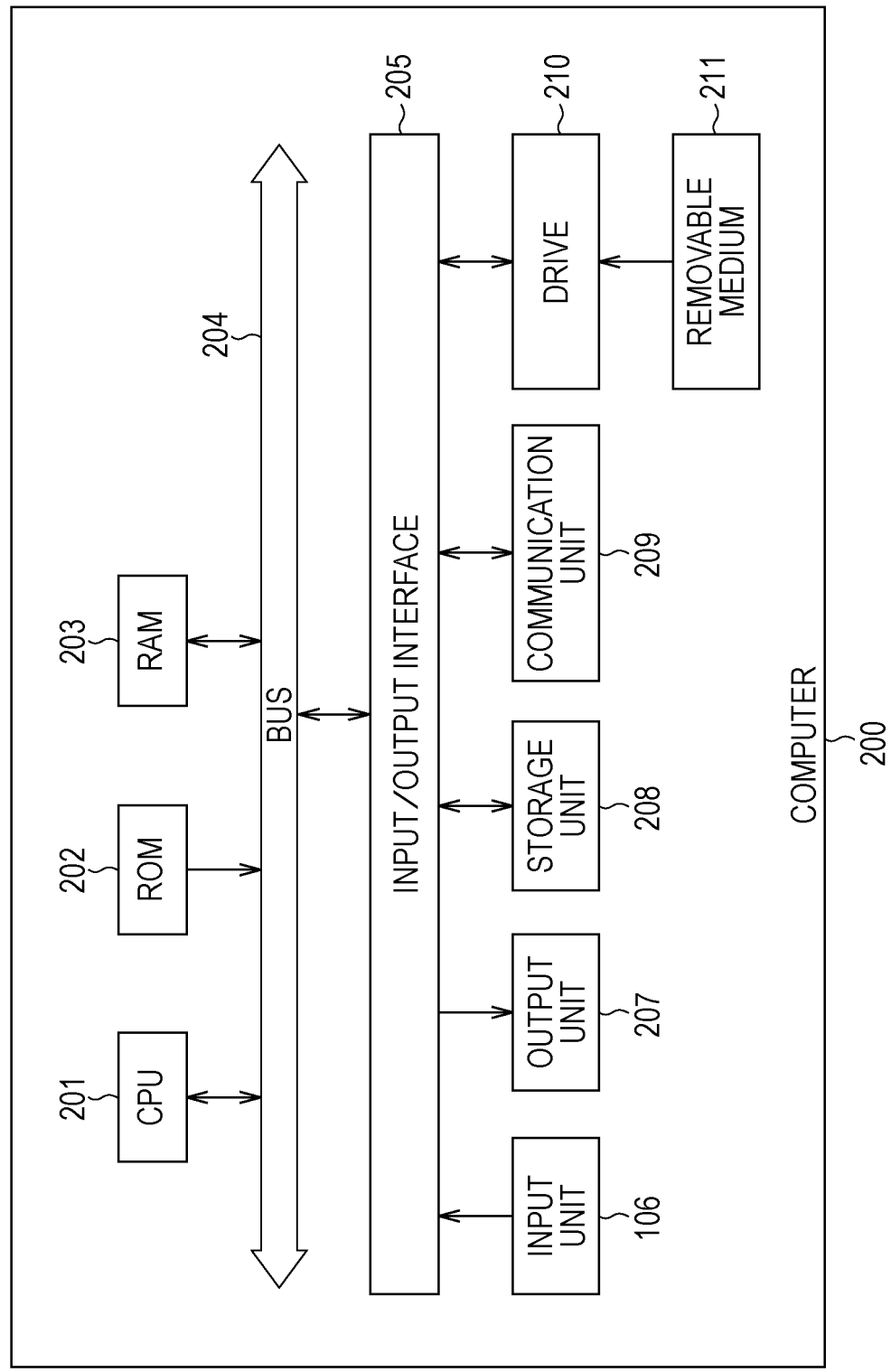
FIG. 22 is a block diagram showing an exemplary configuration of a computer.

FIG. 22 is a block diagram showing an exemplary hardware configuration of the above-described computer.

In this computer 200, a CPU (Central Processing Unit) 201, a ROM (Read Only Memory) 202, and a RAM (Random Access Memory) 203 are connected to each other through a bus 204.

An input/output interface 205 is further connected to the bus 204. An input unit 206, an output unit 207, a storage unit 208, a communication unit 209, and a drive 210 are connected to the input/output interface 205.

The input unit 206 is composed of a keyboard, a mouse, a microphone, etc. The output unit 207 is composed of a display, a speaker, etc. The storage unit 208 is composed of a hard disk, a nonvolatile memory, etc. The communication unit 209 is composed of a network interface, etc. The drive 210 drives a removable medium 211 such as a magnetic disk, an optical disk, a magneto-optical disk, or a semiconductor memory.

In the computer 200 configured in the above-described manner, the above-described series of processes are performed by the CPU 201, for example, loading and executing a program stored in the storage unit 208, in the RAM 203 through the input/output interface 205 and the bus 204.

The program executed by the computer 200 (CPU 201) can be provided by, for example, being recorded in the removable medium 211 serving as a package medium, etc. In addition, the program can be provided through a wired or wireless transmission medium such as a local area network, the Internet, or digital satellite broadcasting.

In the computer 200, by placing the removable medium 211 having recorded therein a program into the drive 210, the program can be installed on the storage unit 208 through the input/output interface 205. In addition, a program can be installed on the storage unit 208 by the communication unit 209 receiving the program through a wired or wireless transmission medium. In addition to the above, a program can be pre-installed on the ROM 202 or the storage unit 208.

Note that the program executed by the computer 200 may be a program that performs processes chronologically in the order described in this specification, or may be a program that performs processes in parallel or at required timing such as when a call is issued.

The embodiment of the present disclosure is not limited to the above-described one, and various changes may be made thereto without departing from the true spirit and scope of the present disclosure.

The present disclosure can also employ configurations such as those shown below.

(1)

A content supply apparatus that delivers streams of content through a plurality of different networks, respectively, according to an adaptive streaming technique, the content supply apparatus including:
a generating unit that generates metadata describing QoS parameters for the respective plurality of different networks through which the streams are delivered, and condition values of the QoS parameters; and
a delivering unit that delivers the generated metadata to a receiver.

(2)

The content supply apparatus according to (1), wherein
the generating unit generates an extended USD as the metadata, and
the delivering unit FLUTE-multicasts the generated extended USD.

(3)

The content supply apparatus according to (1) or (2), wherein the plurality of different networks include at least one of Internet, a terrestrial broadcast network, a satellite broadcast network, a cable television broadcast network, a mobile broadcast network, and a wireless LAN.

(4)

The content supply apparatus according to (2) or (3), wherein the generating unit introduces an MPDBaseMapping element in the USD, introduces a RequierdQos element in the MPDBaseMapping element, and describes, in the RequierdQos element, the QoS parameters for the respective plurality of different networks through which the streams are delivered, and the condition values of the QoS parameters.

(5)

The content supply apparatus according to (2) or (3), wherein the generating unit introduces a RequierdQos element in DeliverMethod of the USD, and describes, in the RequierdQos element, the QoS parameters for the respective plurality of different networks through which the streams are delivered, and the condition values of the QoS parameters.

(6)

A content supply method for a content supply apparatus that delivers streams of content through a plurality of different networks, respectively, according to an adaptive streaming technique, wherein
the content supply apparatus includes:
a generating unit that generates metadata describing QoS parameters for the respective plurality of different networks through which the streams are delivered, and condition values of the QoS parameters; and
a delivering unit that delivers the generated metadata to a receiver.

(7)

A program causing a computer that delivers streams of content through a plurality of different networks, respectively, according to an adaptive streaming technique to function as:
a generating unit that generates metadata describing QoS parameters for the respective plurality of different networks through which the streams are delivered, and condition values of the QoS parameters; and
a delivering unit that delivers the generated metadata to a receiver.

(8)

A terminal apparatus that receives a stream delivered from a content supply apparatus that includes:
a stream delivering unit that supplies streams of content through a plurality of different networks, respectively, according to an adaptive streaming technique;
a generating unit that generates metadata describing QoS parameters for the respective plurality of different networks through which the streams are delivered, and condition values of the QoS parameters; and
a metadata delivering unit that delivers the generated metadata to a receiver, the terminal apparatus being configured to:
obtain the metadata and receive and play back the stream delivered through any one of the plurality of different networks, according to a determination made based on the obtained metadata as to whether reception can be performed.

(9)

A content supply system including a content supply apparatus and a terminal apparatus, wherein
the content supply apparatus includes:
a stream delivering unit that supplies streams of content through a plurality of different networks, respectively, according to an adaptive streaming technique;
a generating unit that generates metadata describing QoS parameters for the respective plurality of different networks through which the streams are delivered, and condition values of the QoS parameters; and
a metadata delivering unit that delivers the generated metadata to a receiver, and
the terminal apparatus is configured to:
obtain the metadata and receive and play back the stream delivered through any one of the plurality of different networks, according to a determination made based on the obtained metadata as to whether reception can be performed.

REFERENCE SIGNS LIST

50 Content supply system
51 Network
52 CDN
60 Content supply apparatus
61 Channel server
62 Segmenter
63 MPD generator
64 FLUTE streamer
65 WEB server
66 Multicast server
67 WEB server
80 Terminal apparatus
100 Computer
101 CPU

The invention claimed is:

1. A content supply apparatus that delivers streams of content through each of a plurality of different networks, respectively, according to an adaptive streaming technique, the content supply apparatus comprising:
  circuitry configured to
    generate an extended User Service Bundle Description (USD) including metadata describing quality of service (QoS) parameters of physical layers for the respective plurality of different networks through which the streams are delivered, and describing condition values of the QoS parameters; and
    multicast the generated extended USD using a unidirectional transport to a receiver, wherein
  the QoS parameters are delay, delay jitter, loss, throughput, radio field intensity, or bit error rate, and
  the condition values are an upper limit, a lower limit, or a specified value.

2. The content supply apparatus according to claim 1, wherein the unidirectional transport is File Delivery over Unidirectional Transport.

3. The content supply apparatus according to claim 1, wherein the plurality of different networks include at least one of Internet, a terrestrial broadcast network, a satellite broadcast network, a cable television broadcast network, a mobile broadcast network, and a wireless local area network (LAN).

4. The content supply apparatus according to claim 1, wherein the circuitry is further configured to introduce an MPDBaseMapping element in the USD, introduce a RequiredQos element in the MPDBaseMapping element, describe, in the RequiredQos element, the QoS parameters of the physical layers for the respective plurality of different networks through which the streams are delivered, and describe the condition values of the QoS parameters in the RequiredQos element.

5. The content supply apparatus according to claim 1, wherein the circuitry is further configured to introduce a RequiredQos element in DeliverMethod of the USD, describe, in the RequiredQos element, the QoS parameters of the physical layers for the respective plurality of different networks through which the streams are delivered, and describe the condition values of the QoS parameters in the RequiredQos element.

6. The content supply apparatus according to claim 1, wherein the condition values are the upper limit or the lower limit.

7. The content supply apparatus according to claim 1, wherein the condition values include a first threshold, a second threshold, and a third threshold.

8. A content supply method for a content supply apparatus that delivers streams of content through each of a plurality of different networks, respectively, according to an adaptive streaming technique, the method comprising:
  generating an extended User Service Bundle Description (USD) including metadata describing quality of service (QoS) parameters of physical layers for the respective plurality of different networks through which the streams are delivered, and describing condition values of the QoS parameters; and
  multicasting the generated extended USD using a unidirectional transport to a receiver, wherein
  the QoS parameters are delay, delay jitter, loss, throughput, radio field intensity, or bit error rate, and
  the condition values are an upper limit, a lower limit, or a specified value.

9. A non-transitory, computer readable medium storing a program for causing a computer to perform the method of:
  delivering streams of content through each of a plurality of different networks, respectively, according to an adaptive streaming technique;
  generating an extended User Service Bundle Description (USD) including metadata describing quality of service (QoS) parameters for the respective plurality of different networks through which the streams are delivered, and describing condition values of the QoS parameters; and
  multicasting the generated extended USD using a unidirectional transport to a receiver, wherein
  the QoS parameters are delay, delay jitter, loss, throughput, radio field intensity, or bit error rate, and
  the condition values are an upper limit, a lower limit, or a specified value.

10. A receiving apparatus, comprising:
  circuitry configured to
    receive streams of content through each of a plurality of different networks, respectively, according to an adaptive streaming technique;
    receive an extended User Service Bundle Description (USD) including metadata describing quality of service (QoS) parameters of physical layers for the respective plurality of different networks through which the streams are delivered, and describing condition values of the QoS parameters; and
    select and play back one of the streams according to the QoS parameters of the physical layers for the respective plurality of different networks described in the received metadata and according to a capability of the receiving device, wherein
  the QoS parameters are delay, delay jitter, loss, throughput, radio field intensity, or bit error rate,
  the condition values are an upper limit, a lower limit, or a specified value, and
  the extended USD is multicast using a unidirectional transport.

11. The receiving apparatus according to claim 10, wherein the metadata includes a service announcement received from the multicast using the unidirectional transport multicast.

12. The receiving apparatus according to claim 11, wherein the plurality of different networks include at least one of Internet, a terrestrial broadcast network, a satellite broadcast network, a cable television broadcast network, a mobile broadcast network, and a wireless LAN.

13. A content supply system, comprising:
  a receiving apparatus; and a content supply apparatus including first circuitry configured to
  deliver streams of content through each of a plurality of different networks, respectively, according to an adaptive streaming technique;
  generate an extended User Service Bundle Description (USD) including metadata describing quality of service (QoS) parameters of physical layers for the respective plurality of different networks through which the streams are delivered, and describing condition values of the QoS parameters; and
  multicast the generated extended USD using a unidirectional transport to the receiving apparatus; wherein
the receiving apparatus includes second circuitry configured to
  receive the streams of content through the plurality of different networks, respectively, according to the adaptive streaming technique;
  receive the metadata describing the QoS parameters of the physical layers for the respective plurality of different networks through which the streams are delivered, and describing the condition values of the QoS parameters; and
  select and play hack one of the streams according to the QoS parameters for the respective plurality of different networks described in the received metadata and according to a capability of the receiving device,
the QoS parameters are delay, delay jitter, loss, throughput, radio field intensity, or bit error rate, and
the condition values are an upper limit, a lower limit, or a specified value.

14. A method performed by a receiving apparatus; the method comprising:
  receiving streams of content through each of a plurality of different networks, respectively, according to an adaptive streaming technique;
  receiving an extended User Service Bundle Description (USD) including metadata describing quality of service (QoS) parameters of physical layers for the respective plurality of different networks through which the streams are delivered, and describing condition values of the QoS parameters; and
  selecting and playing back one of the streams according to the QoS parameters of the physical layers for the respective plurality of different networks described in the received metadata and according to a capability of the receiving device, wherein
the QoS parameters are delay, delay jitter, loss, throughput, radio field intensity; or bit error rate,
the condition values are an upper knit, a lower limit, or a specified value, and
the extended USD is multicast using a unidirectional transport.

15. The receiving apparatus according to claim 14, wherein the metadata includes a service announcement received from the multicast using the unidirectional transport.

16. The receiving apparatus according to claim 15, wherein the plurality of different networks include at least one of Internet, a terrestrial broadcast network, a satellite broadcast network, a cable television broadcast network, a mobile broadcast network, and a wireless LAN.

17. A non-transitory, computer readable medium storing a program that, when executed by a computer, causes the computer to:
  receive streams of content through each of a plurality of different networks, respectively, according to an adaptive streaming technique;
  receive an extended User Service Bundle Description (USD) including metadata describing quality of service (QoS) parameters of physical layers for the respective plurality of different networks through which the streams are delivered, and describing condition values of the QoS parameters; and
  select and play back one of the streams according to the QoS parameters of the physical layers for the respective plurality of different networks described in the received metadata and according to a capability of the receiving device, wherein
the QoS parameters are delay, delay jitter, loss, throughput, radio field intensity, or bit error rate,
  the condition values are an upper limit, a lower limit, or a specified value, and
the extended USD is multicast using a unidirectional transport.

* * * * *